(12) United States Patent
Churchill, Jr.

(10) Patent No.: US 11,143,344 B2
(45) Date of Patent: Oct. 12, 2021

(54) FLUID CONNECTION APPARATUS

(71) Applicant: John R. Churchill, Jr., Lakewood, NY (US)

(72) Inventor: John R. Churchill, Jr., Lakewood, NY (US)

( * ) Notice: Subject to any disclaimer, the term of this patent is extended or adjusted under 35 U.S.C. 154(b) by 285 days.

(21) Appl. No.: 15/870,739

(22) Filed: Jan. 12, 2018

(65) Prior Publication Data

US 2019/0219203 A1 Jul. 18, 2019

(51) Int. Cl.
*F16L 27/093* (2006.01)
*F16B 43/00* (2006.01)
*F16L 41/00* (2006.01)
*F16L 33/30* (2006.01)

(52) U.S. Cl.
CPC .......... *F16L 27/093* (2013.01); *F16B 43/001* (2013.01); *F16L 41/005* (2013.01); *F16L 33/30* (2013.01)

(58) Field of Classification Search
CPC ..... F16L 27/093; F16L 41/005; F16B 43/001; F16B 37/044; F16B 37/041; F16B 37/043
USPC .................................................. 285/23, 190
See application file for complete search history.

(56) References Cited

U.S. PATENT DOCUMENTS

| | | | |
|---|---|---|---|
| 4,074,491 A * | 2/1978 | Bell | F16B 37/041 |
| 4,672,998 A * | 6/1987 | Kozak, III | F16L 27/093 |
| | | | 285/190 |
| 5,362,111 A * | 11/1994 | Harbin | |
| 5,403,041 A | 4/1995 | Merkel et al. | |
| 6,685,232 B2 | 2/2004 | Sampson | |
| 7,226,088 B2 | 6/2007 | Skiba et al. | |
| 7,988,201 B2 | 8/2011 | Randle | |
| 2001/0045743 A1 * | 11/2001 | Wieder | 285/23 |
| 2007/0182156 A1 * | 8/2007 | Petrykowski | F16L 41/005 |
| | | | 285/190 |
| 2008/0258461 A1 * | 10/2008 | Heath | 285/190 |

* cited by examiner

*Primary Examiner* — Zachary T Dragicevich
(74) *Attorney, Agent, or Firm* — The Bilicki Law Firm, PC; James A. Cairns

(57) ABSTRACT

A fluid connection apparatus, in which a carrier body and washer configuration are overmolded together, is configured for use in a fluid transfer assembly. The carrier body may be generally U-shaped, having two substantially parallel portions connected by a bridging portion. Each substantially parallel portion of the fluid connection apparatus includes a washer configuration including one or more washers. The fluid connection apparatus may be used to connect a fluid line fitting to an apparatus intended to provide or receive fluid through the fluid line, using a connector having a fluid passage formed therein. The fluid line fitting is placed between the two substantially parallel portions, and a connector having a fluid passage formed therein is inserted through one side of the fluid connection apparatus, through the fluid line fitting, and through the other side of the fluid connection apparatus. The fluid connection apparatus may include stabilizing features, such as ribs in the bridging portion or enlarged radii, to protect against distortion and breakage.

6 Claims, 6 Drawing Sheets

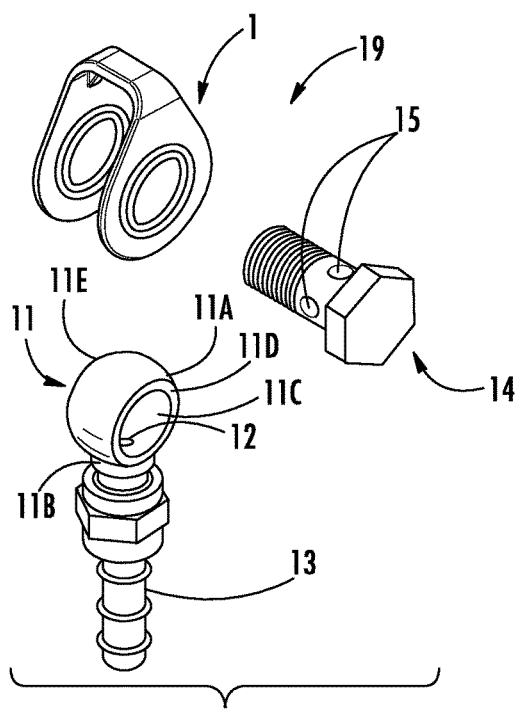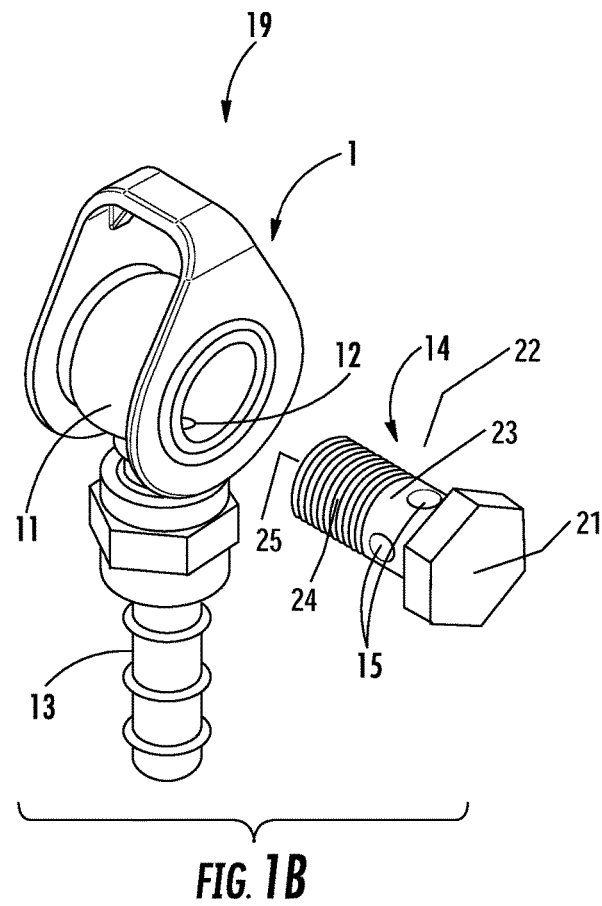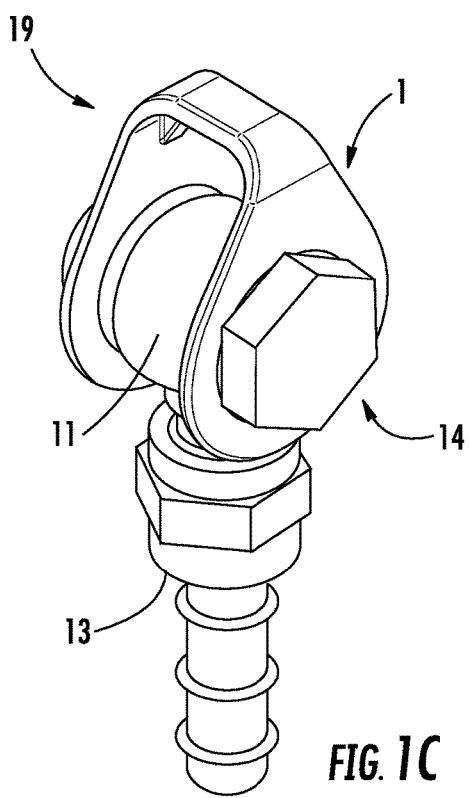
FIG. 1A
FIG. 1B
FIG. 1C

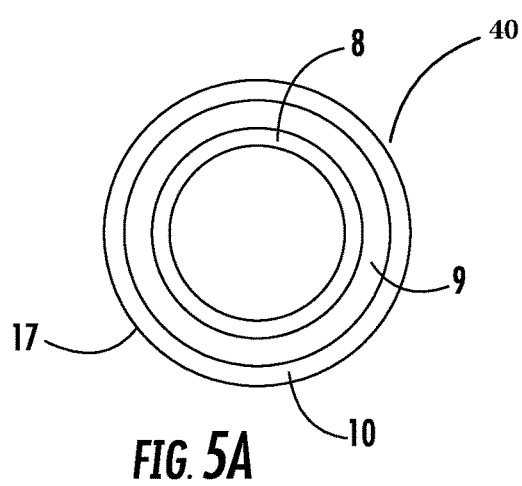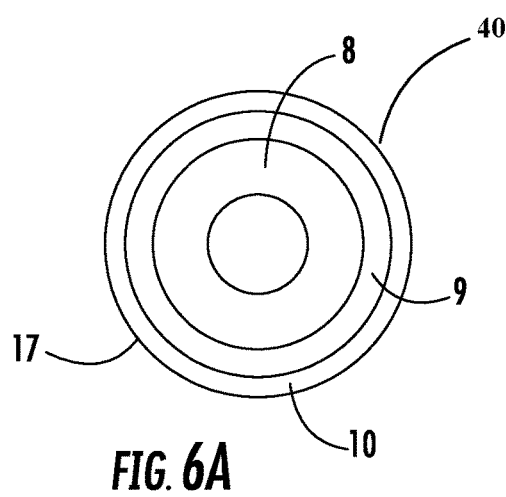
FIG. 5A    FIG. 6A
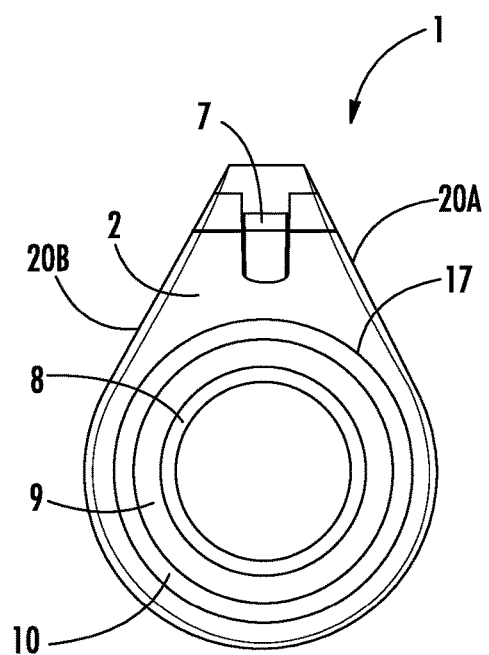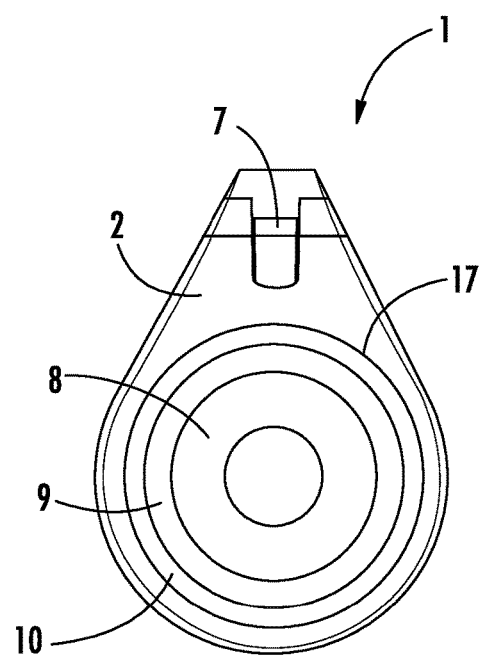
FIG. 5B    FIG. 6B

FLUID CONNECTION APPARATUS

BACKGROUND

Fluid transfer assemblies may include fluid line fittings commonly referred to as banjo fittings. Banjo fittings may be used at the terminal end of a fluid line, or be designed for attachment to the terminal end of a fluid line. The banjo fitting may connect with a fluid line and have a radial passage for fluid flow. The banjo fitting may be used to provide or receive fluid through the fluid line using a connector that has a fluid passage formed within it.

SUMMARY

The present application is directed to a fluid connection apparatus, a fluid transfer assembly that includes the fluid connection apparatus, and a method of connecting a fluid line fitting with an apparatus intended to be in fluid communication with the fluid line fitting. The fluid connection apparatus includes two spaced-apart substantially planar portions each having an inner surface, an outer surface, an upper end, a lower end, and an annular opening. The respective inner surfaces may face and be substantially parallel to each other. The fluid connection apparatus may also include a bridging portion having an upper surface and a lower surface which connects the two upper ends and is substantially perpendicular to the plane of the two substantially planar portions. First and second washers cover portions of the two annular openings.

BRIEF DESCRIPTION OF DRAWINGS

FIG. 1A is a view of a fluid transfer assembly including a fluid line fitting attached to a barb connector, the present fluid connection apparatus, and a connector having a fluid passage formed therein, prior to their assembly.

FIG. 1B is a view of the fluid transfer assembly with a fluid line fitting attached to a barb connector, the present fluid connection apparatus, and a connector having a fluid passage formed therein, with the fluid line fitting being present inside the present fluid connection apparatus, but with the connector having a fluid passage formed therein still spaced apart.

FIG. 1C is a view of the fluid transfer assembly with a fluid line fitting attached to a barb connector, the present fluid connection apparatus, and a connector having a fluid passage formed therein, with the fluid line fitting being present inside the present fluid connection apparatus and the connector having a fluid passage formed therein inserted through the present fluid connection apparatus and the fluid line fitting.

FIG. 5A is an example of a washer configuration that may be overmolded with the fluid connection carrier.

FIG. 5B is a side perspective view of the present fluid connection apparatus in which the washer configuration of FIG. 3A has been overmolded with the fluid connection carrier.

FIG. 6A is another example of a washer configuration that may be overmolded with the fluid connection carrier.

FIG. 6B is a side perspective view of the present fluid connection apparatus in which the washer configuration of FIG. 4A has been overmolded with the fluid connection carrier.

DETAILED DESCRIPTION

Figure 2:
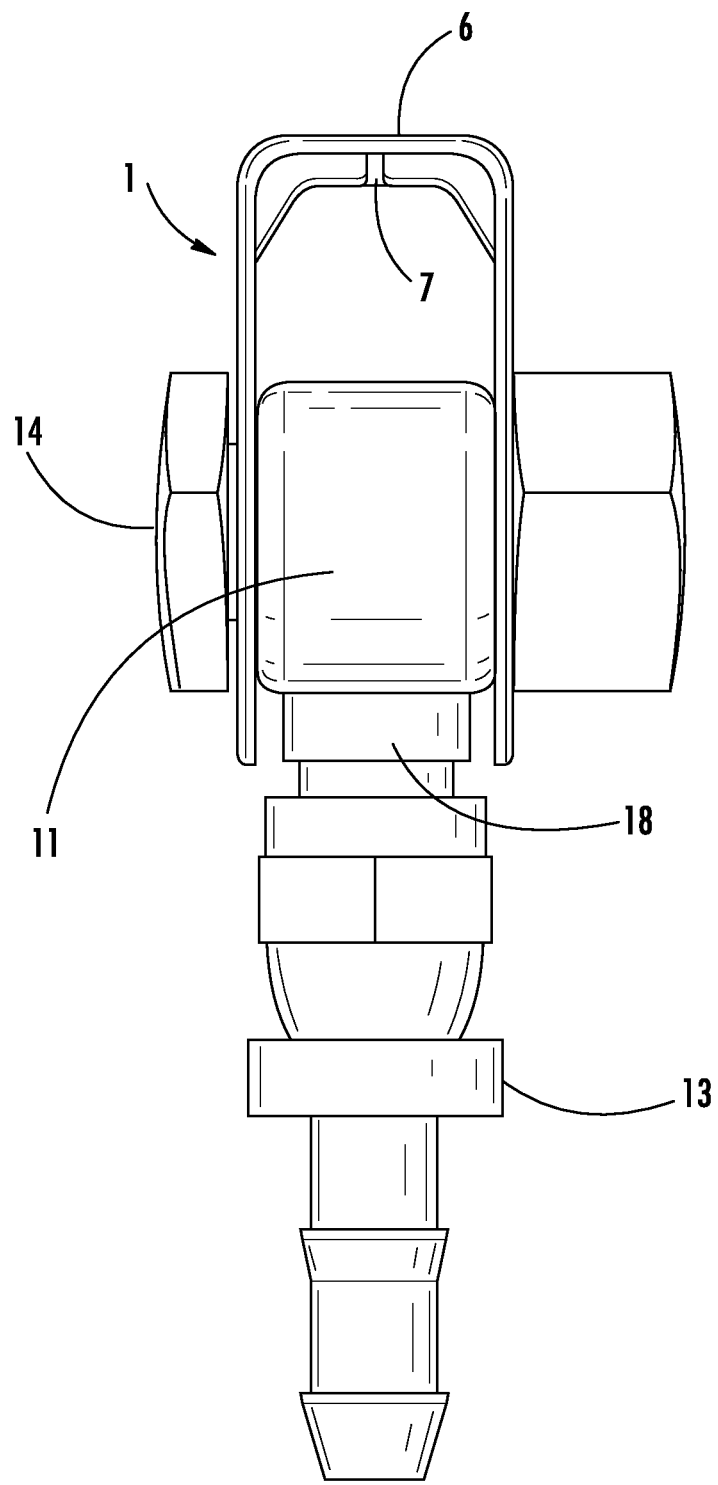
FIG. 2 is a side view of the fluid transfer assembly including the present fluid connection apparatus in connected relationship with a fluid line fitting and connector having a fluid passage formed therein.

The present application is directed to a fluid connection apparatus 1 configured to facilitate the connection and sealing between a fluid line fitting 11 on a fluid line and a connector 14, as shown in FIGS. 1A-2. The fluid line, which is not shown, connects to barb 13 as shown in FIGS. 1A-2 but may be connected to fluid line fitting 11 in any other suitable manner, including but not limited to a worm gear clamp, spring hose clamp, wire hose clamp, or T-bolt type clamp. Alternatively the fluid line fitting does not need to be a separate piece that is attached to a fluid line, but may instead be an integral feature of the fluid line.

Fluid line fitting 11 may be referred to as a "banjo" block or "banjo" fitting. For purposes of this description, "fluid line fitting", "banjo block", "banjo coupling", and "banjo fitting" may be used interchangeably to refer to the terminal end of a fluid line, or a fitting designed for attachment to the terminal end of a fluid line, having the shape of a hollow, truncated solid, and having a radial passage for fluid flow which connects the inner wall of the hollow, truncated solid to a fluid line of which it is a terminal end or to which it is attached. One example of such a hollow truncated solid may be seen in fluid line fitting 11 as shown in FIG. 1A, having upper portion 11A which may be described as a hollow sphere that is symmetrically truncated on each side of a plane falling on a diameter of the sphere; this shape may also be described as a spherical frustum, or a sphere with two symmetrical spherical caps removed, and may be considered to have at least approximately the shape of a torus. The outer surface of the fluid line fitting may be wholly arcuate as in FIG. 1A; partially arcuate; rectilinear (such as a truncated, hollow cube or hollow rectilinear solid); or any combination thereof.

The fluid line fitting may include a lower portion in the form of fluid conducting portion 11B for connecting the fluid line fitting to a fluid line. An internal passage extends longitudinally along the fluid conducting portion and exits in the hollow interior of the fluid line fitting, as shown in FIG. 1A at 12.

Connector 14 may be any connector having a fluid passage formed therein, including a screw, bolt, hollow bolt, or banjo bolt, having an internal passage for conducting fluid, that is capable of being inserted through fluid line fitting 11 in order to connect a fluid line that is in fluid communication with the fitting to another apparatus intended to receive or transmit fluid through the fluid line.

For purposes of the present application, "Fluid" refers to (i) any liquid or gas, including but not limited to water, oil, hydraulic fluid, pneumatic fluid, drilling fluid, and fuel (including but not limited to gasoline, diesel fuel, and kerosene); (ii) any solid capable of being transported by flow similar to a liquid, including by aeration; and (iii) any mixture of fluid and solid capable of being transported by flow similar to a liquid, such as a slurry. Further, "substantially" has its ordinary and accepted meaning as applied in the context of the present apparatus, meaning for example that portions of an apparatus described as "substantially parallel" to each other do not need to be absolutely parallel to each other and may deviate in parallel orientation to each other up to any amount that will still permit the fluid connection apparatus to be assembled to a fluid fitting without undue stress to the fluid connection apparatus, and while maintaining seal integrity when so assembled.

With reference to FIG. 1A, a fluid transfer assembly 19 is shown including fluid connection apparatus 1, connector 14, and fluid line fitting 11; in FIG. 1A these are shown as separate pieces, aligned for connection. Fluid line fitting 11 includes first portion 11A and second, fluid conducting portion 11B extending outward from the outer surface of first portion 11A and having central interior passage 12 terminating at one end on the inner surface of first portion 11A. Fluid conducting portion 11B may include, or be attachable to, a barbed fitting or connector 13 to facilitate connection of the fluid line fitting 11 to a fluid line. Alternatively, the fluid line fitting 11 may be part of and so integral with the fluid line rather than a separate piece.

Fluid line fitting passage 12 extends longitudinally along the interior of fluid conducting portion 11B of fluid line fitting 11 to provide fluid connection between the fluid line fitting 11 and barbed connector 13, to which a fluid line may be readily attached. Other methods of attaching a fluid line to the fitting may be used; alternatively, the fluid line or fluid line fitting 11 may be integral with, and form a terminal end of, the fluid line.

First upper portion 11A of fluid line fitting 11 further includes aperture 11C with first and second annular openings 11D and 11E through which connector 14 may be inserted to connect a fluid line attached to fluid line fitting 11 to an apparatus intended to receive or provide fluid through the fluid line. When connector 14, i.e. a hollow bolt having transverse passages or fluid passages 15 connecting to a longitudinal passage that terminates in an opening at the end of the shaft of hollow connector 14, is inserted through the annular openings 11D and 11E, passage 15 is brought within aperture 11C such that a fluid connection is formed between passage 12 in fluid conducting portion 11B of fluid line fitting 11, passage 11C of fluid line fitting 11, and passage 15 in connector 14. The interior surface of passage 11C may or not be threaded, such as to engage a threaded hollow connector when inserted.

Connector 14 may be a hollow bolt having a proximal end 21 with a head or other structure intended for use in threading and tightening and/or loosening the bolt with a tool, such as a wrench; a shaft 22 extending longitudinally from the proximal end; and a distal end 25. The shaft is at least partially threaded, and includes at least two internal passages; a first passage extending longitudinally along the shaft and for at least a portion of its length, terminating in an opening in distal end 25 of the bolt; and a second passage transverse to the first passage and shown as 15 in FIGS. 1A and 1B. More than one first, longitudinal passage and/or second, transverse passage may be present. The shaft may include both an unthreaded portion 23 and a threaded portion 24, usually with the unthreaded portion adjacent proximal end 21 and extending partially along the length of shaft 22, transitioning to threaded portion 24 that will usually, but not necessarily, continue to the distal end of the bolt. In this configuration the second or transverse passage(s) will usually be present in the unthreaded portion of the shaft. However, the entirety of shaft 22 may be threaded, or unthreaded with a mechanism other than threading provided to secure hollow connector 14 in sealed assembly with fluid connection apparatus 1 and fluid line fitting 11.

As shown In FIG. 1B, fluid line fitting 11 has been brought within a space formed in fluid connection apparatus 1, which will be described below. Connector 14 with passages 15 is aligned with a annular first opening of the fluid connection apparatus 1, fluid line fitting 11, and an annular second opening of the fluid connection apparatus 1. In FIG. 1C, connector 14 is shown inserted through the annular first opening of the fluid connection apparatus, the fluid line fitting 11, and the annular second opening in the second planar portion of the fluid connection apparatus 1.

Using FIGS. 1A-1C as a reference, and taking as an example an apparatus in which fluid will flow from a fluid line towards the fluid line fitting, the fluid will flow from the fluid line into the barb 13; then into passage 12, entering aperture 11C; next the fluid will enter transverse passage(s) 15, and then flow down the longitudinal interior passage of hollow connector 14, exiting the connector through an aperture in distal end 25. The reverse order would be followed when the fluid flow occurs in the opposite direction.

Figure 3A:
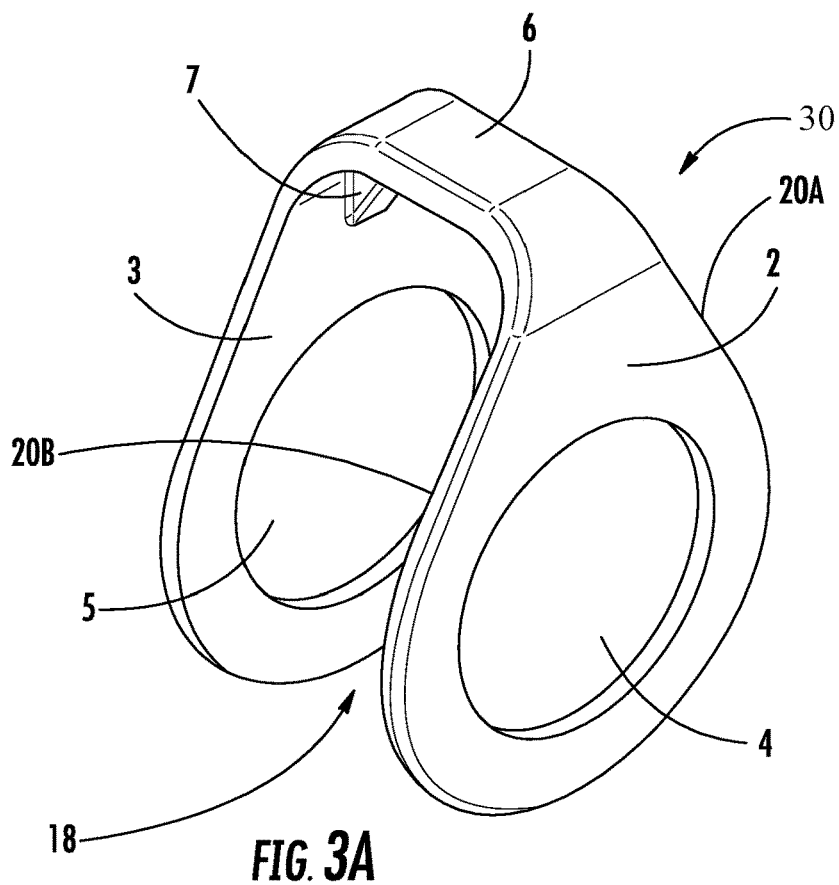
FIGS. 3A and 3B are perspective drawings of a fluid connection apparatus carrier without washers, in, respectively, vertical and horizontal orientations.
Figure 3B:
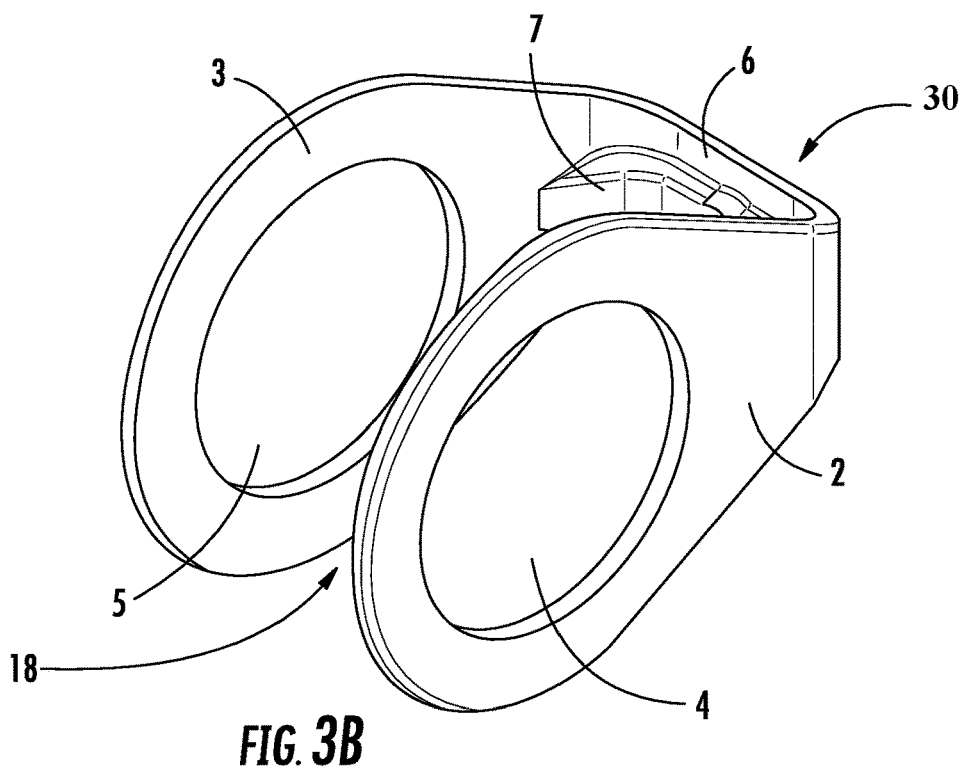

Fluid connection assembly 1 includes at least two functional portions which may be overmolded together. The first portion is a U-shaped or saddle-shaped portion 30 as shown in FIGS. 3A and 3B. The second portion is a washer configuration 40 associated with each of apertures 4 and 5. The U-shaped portion without the washers present may be referred to herein as the fluid connection carrier, or simply the carrier 30, while the U-shaped carrier with the washer configuration 40 present may be referred to as the fluid connection apparatus 1.

The U-shaped carrier 30 includes first parallel portion 2 and second parallel portion 3. The two parallel portions, 2 and 3, are joined by a bridging portion 6, with a central space 18 present between the two parallel portions, 2 and 3, to accept a fluid line fitting. Bridging portion 6 may include stabilizing portion 7 to provide resistance to excessive movement of parallel portions 2 and 3 towards or away from each other. Some flexibility may be acceptable in parallel portions 2 and 3.

Parallel portions 2, 3 have respective annular openings 4 and 5 such that, when a fluid line fitting 11 is brought into the central space 18 in an assembled configuration, the threaded end of a hollow connector 14 may be inserted first through one annular opening, then through the fluid line fitting 11, and then through the second annular opening 5. In the assembled configuration, the fluid line fitting 11 is placed into central space 18 of the fluid connection apparatus 1 with the annular openings 11D and 11E of the fluid line fitting 11 aligned with the annular openings 4 and 5 of parallel portions 2 and 3, and with the fluid conducting portion 11B of the fluid line fitting 11 directed so as not to prevent assembly of the fluid line fitting 11 to the fluid connection apparatus 1 through contact with the bridging portion 6 of the fluid connection apparatus 1.

Fluid connection assembly 1 may include stabilizing features 7 associated with the bridging portion 6, such as ribs or struts, to resist excessive distortion when the bolt or other connector is tightened, as well as to prevent distortion of the fluid connection apparatus 1 during manufacture, packing, unpacking, and other handling. The fluid connection apparatus 1 may have some, limited flexibility so that an assembler can more readily manipulate it as needed during installation, such as to achieve full alignment of the hollow with the annular openings in the fluid connection apparatus and fluid line fitting prior to insertion of the hollow connector.

Figure 4A:
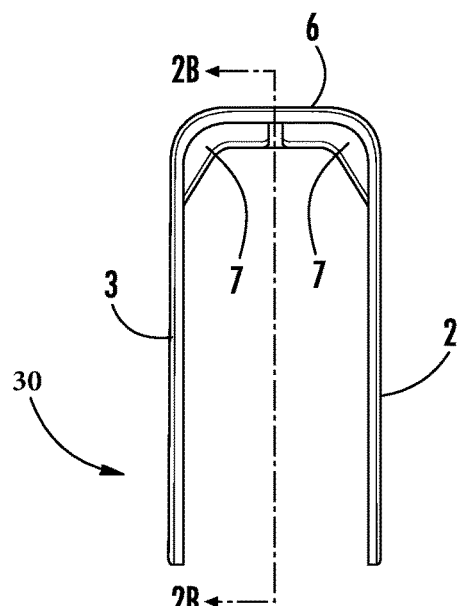
FIG. 4A is an end-on view of the fluid connection carrier of FIGS. 3A and 3B.
Figure 4B:
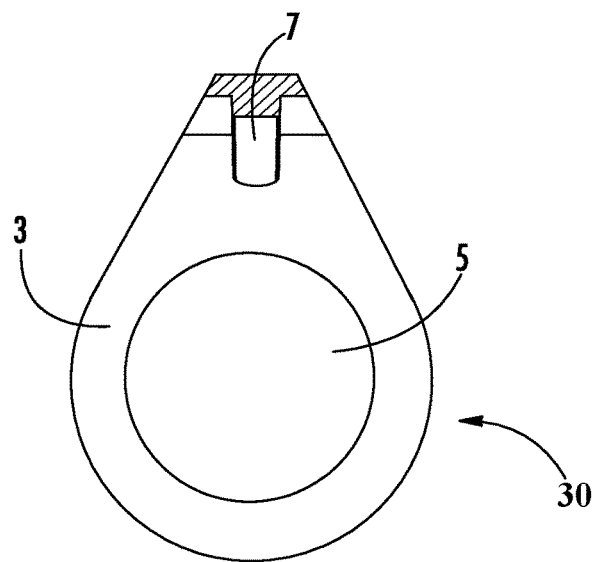
FIG. 4B is a side view of the fluid connection carrier of FIG. 4A, taken along lines A-A.
Figure 4C:
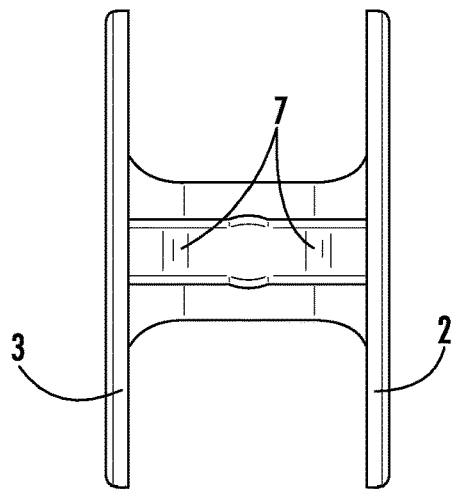
FIG. 4C is a view of the fluid connection carrier of FIG. 4A showing the underside of the bridging portion.

FIGS. 4A-4C provide additional views of the carrier 30 of the fluid connection apparatus shown in FIGS. 3A and 3B. FIG. 4A provides a side view of the carrier 30, including parallel portions 2 and 3, bridging portion 6, and stabilizing portion 7. FIG. 4B provides a view along lines A-A of FIG. 4A, including second parallel portion 3, second annular opening 5, and stabilizing portion 7. FIG. 4C is a view up from the bottom of the carrier 30 as shown in FIG. 4A, including first and second parallel portions 2 and 3, and stabilizing portion 7.

First and second portions 2 and 3 are depicted in the figures, and are generally described herein, as parallel or as substantially parallel. This is because at least most fluid line fittings will have substantially parallel faces for assembly to the fluid connection apparatus. However, the present fluid connection apparatus may readily be configured to match the configuration of the fluid line fitting for which its use is intended. For example, one can envision a V-shaped fluid line fitting in which one connector having a fluid passage formed therein is inserted into one side of the V and another connector having a fluid passage formed therein is inserted into the other side, such as to connect two fluid lines. The present fluid connection fitting could then be designed in a corresponding V shape, in which a first substantially planar portion would be parallel with one side of the V and a second substantially planar portion would be parallel with the other side of the V, but the two portions would not be parallel with each other. Therefore, while the first and second portions should each be parallel with the corresponding surface of the fluid line fitting to which they are assembled, it is not necessary that they be parallel to each other.

First and second portions 2 and 3 are also depicted in the figures, and may be generally described herein, as planar or substantially planar. As with the parallelism discussed above, however, this planarity is not a functional requirement of the fluid connection apparatus as such, but rather reflects the fact that most if not all fluid line fittings with which it will be used will have substantially planar sides to which the fluid connection apparatus will be assembled. The outer surfaces of at least the first and second portions do not seal directly against the corresponding faces of the fluid line fitting, and therefore may have any configuration, and/or include any features, that do not prevent effective use of the fluid connection apparatus. In particular but without limitation, the outer surface of either or both of first and second portions 2 and 3 may include stand-offs, captivators such as to secure and/or route fluid lines, wires or cables, and other functional features without departing from the present scope.

In an embodiment where first and second portions 2 and 3 are designed to be substantially parallel, significant deviation from that parallelism may be introduced unintentionally during manufacture, packing, unpacking, and use of the fluid connection apparatus without compromising its utility. This is because the process of tightening the connector having a fluid passage formed therein to assemble the bolt, fluid connection apparatus, fluid line fitting, and the apparatus with which the fluid line is being connected will compress first and second portions 2, 3 against the corresponding faces of the fluid line fitting, and this compression will bias the two portions 2, 3 towards sealing orientations.

In the fluid connection apparatus 1, each annular opening 4 and 5 includes washer configuration 40 to seal the connection between the fluid line fitting 11 and the hollow connector having fluid passage 15. When the fluid line fitting 11 is placed between and oriented with the annular first opening and annular second opening of the fluid connection apparatus 1, sealing may be accomplished by tightening the threaded end of the hollow connector that extends through the second annular opening into a correspondingly threaded receptacle intended to receive a fluid from or provide a fluid to the fluid line. Tightening of the hollow connector biases the annular first opening and annular second opening of the fluid connection apparatus 1, and the washer configuration 40 associated with each, towards each other, causing each washer configuration 40 to be compressed against, and seal the connection of the fluid connection apparatus with, a corresponding face of the fluid line fitting, as shown in FIGS. 1C and 2. As noted previously, the hollow connector, fluid connection apparatus, and fluid line fitting may alternatively be brought into sealed association other than by using a threaded hollow connector, such as by welding, brazing, or otherwise.

Figure 8:
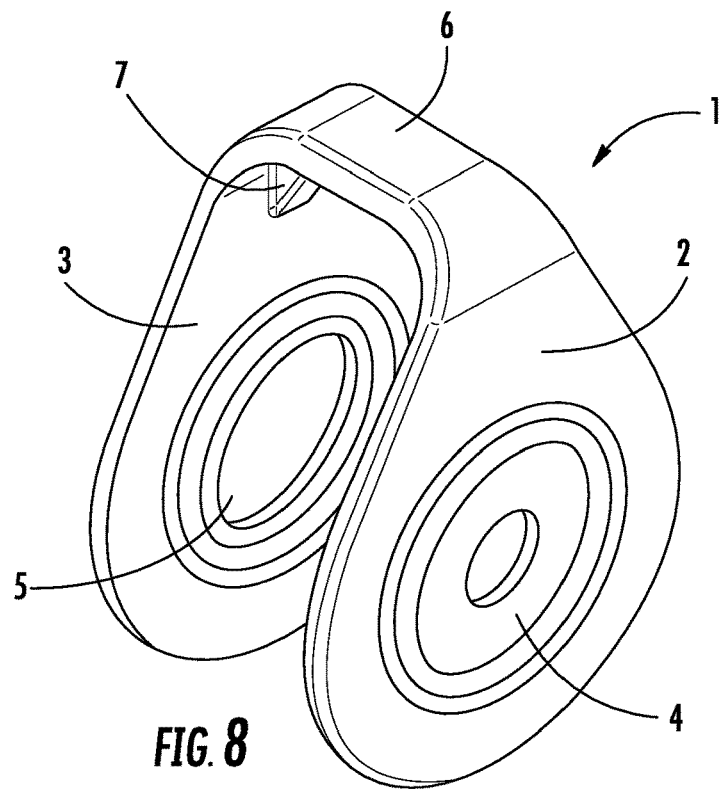
FIG. 8 is a perspective view of the present fluid connection apparatus in which the washer configuration of FIG. 5A has been overmolded with one side of the fluid connection carrier and the washer configuration of FIG. 6A has been overmolded with the other side of the fluid connection carrier.

Representative, but non-limiting, washer configurations, each generally referred to at 40, are shown in FIGS. 5A and 6A, and fluid connection assemblies including those washer configurations 40 are shown in, respectively, FIGS. 5B and 6B. The primary difference between the washer configurations 40 shown in FIGS. 5A and 6A, and in FIGS. 5B and 6B, is that the inner diameter of the washer configuration 40 in FIGS. 6A and 6B is smaller than the inner diameter of washer configuration 40 shown in FIGS. 5A and 5B. The inner and outer diameter of each washer may be varied based on the intended application, and washer configurations 40 having different inner and/or outer diameters may be used on the same fluid connection apparatus, as shown in FIG. 8. Washer configuration 40 may be made up of more than one washer at either or both of the annular first opening and annular second opening, with the only limitations on the number of washers being the constraints of the overmolding process and the need to retain functional compatibility for use in sealing against the fluid line fitting.

Figure 7:
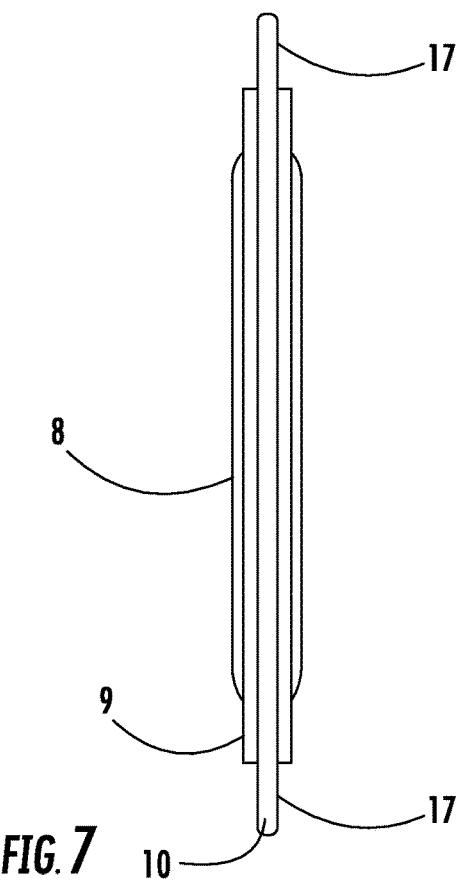
FIG. 7 is a side view of a washer configuration that may be overmolded with the fluid connection carrier.

As shown in FIG. 7, washer configuration 40 includes a first planar segment 10, a second planar segment 9, and a third planar segment 8, though fewer or additional planar segments may be present, or one or more planar segments may be provided by additional washers. First planar segment 10 has a first side, a second side, a first thickness, and a first diameter; second planar segment 9 is disposed on the first side of first planar segment 10 and has a second thickness and a second diameter; and third planar segment 8 is disposed on the second side of said first planar segment 10 and has a third thickness and a third diameter. As shown each planar segment has a different diameter such that the first diameter is larger than the second diameter and the second diameter is larger than the third diameter, but alternative configurations may be used without departing from the present scope. Similarly, the inner diameters of the planar segments may be the same, or different, and the washers may be but are not necessarily substantially circular.

As shown in the end view of FIGS. 5B and 6B, the outer perimeter of first parallel portion 2 has a curved lower portion and an upper linear portion on each side. Linear portions 20A and 20B, shown in FIGS. 3A and 5B, are radial to the curved portion of parallel portion 2 and terminate at the top sides of bridging portion 6. Second parallel portion 3 has the same structure. It will be understood that the rigidity and strength of the carrier 30 may be altered by changing the angle of convergence of the linear portions, or radii, and the placement of the bridge. For purposes of this discussion, the angle of convergence of the radii is defined as the angle at which they would meet if both were extended symmetrically until they intersected; that angle may also be visualized as the interior angle formed at the apex of an inverted "V" formed by the two radii. That apex may be relatively near outer diameter step 17, in which case the angle of convergence is relatively large and approaches 180°, or relatively spaced from it, in which case the angle of convergence is relatively small and—in theory at least—approaches 0°. In addition to varying the angle of convergence, for any such angle the bridge may be located at any position along the radii prior to the imaginary point of intersection. Moreover, rather than converging, the radii may extend upward parallel to each other and at right angles to a horizontal diameter bisecting the washers as shown in FIGS. 5B and 6B, with the bridging portion then having the same width as the diameter of parallel portions 2 and 3.

FIG. 7 shows a washer configuration 40 for use in the present fluid connection apparatus 1 from a side perspective. Washer configuration 40 includes inner washer portion 8, intermediate washer portion 9, and outer washer portion 10. Additional washer portions, and additional washers, may be included in the overmolded assembly as desired. FIGS. 5A through 7 also show outer diameter step feature 17, which facilitates secure overmolding between the washer and carrier 30 and provides an advantageous mating or sealing surface for the aligning hardware. The washers may be color-coded according to inner or outer diameter, material, fluid compatibility, or other characteristics to facilitate packing, storage, and use.

FIG. 8 is a perspective view of the present fluid connection apparatus in which the washer configuration 40 of FIG. 5A has been overmolded with one side of the fluid connection carrier 30 and the 40 configuration of FIG. 6A has been overmolded with the other side of the fluid connection carrier 30.

The carrier 30 and washer configuration 40 of the present fluid connection apparatus 1 may be formed of any material capable of overmolding and that otherwise meets the specifications of the intended use. Plastic may be used, such as thermoplastic, including but not limited to acrylonitrile butadiene styrene. Both the carrier 30 and the washers of washer configuration 40 may be composed of plastic, or one may be composed of a metal to which the other, plastic part is overmolded; in the case of the washers, the metal would need to be sufficiently deformable to provide a compression seal. Where plastic is used for both the carrier 30 and washer configuration 40, the plastic may be the same plastic for each or different plastics may be used. Similarly, the washers may be composed all of the same material, or of different materials, including rubber or a rubber coating. The substantially planar portions of the carrier 30 may be solid, or may be formed with an interior void to facilitate overmolding of the washers. Use of other materials and techniques will be apparent to those of skill in the art and are within the present scope.

Variability in manufacture of the fluid connection apparatus, including forces applied to the carrier 30 during the overmolding process and in packing, unpacking, handling, and assembly of the fluid connection apparatus, may each or all cause some variation in relationship or orientation of the portions of the fluid connection apparatus relative to each other without causing it to become unusable, provided that when the fluid connection apparatus is assembled to a fluid fitting and a banjo bolt is used to connect the fluid fitting and fluid connection apparatus, the fluid connection apparatus maintains sufficient dimensional integrity to provide an effective seal for the fluid.

While the present fluid connection apparatus and its use have been described with reference to particular embodiments, it will be understood by those skilled in the art that various changes may be made and equivalents may be substituted for elements thereof without departing from the intended scope. In addition, many modifications may be made to adapt a particular situation or material to these teachings without departing from the intended scope. Therefore, it is intended that the scope not be limited to the particular embodiments disclosed herein, but rather will include all embodiments falling within the scope and spirit of the appended claims.

I claim:

1. A fluid connection apparatus to facilitate connection of a fluid line fitting and a connector having a fluid passage formed therein, said fluid connection apparatus comprising:
a first substantially planar portion having an inner first surface, an outer first surface, an upper end, a lower end, and an annular first opening;
a second substantially planar portion having an inner second surface, an outer second surface, an upper end, a lower end, and an annular second opening, said inner second surface facing said inner first surface, said first substantially planar portion and said second substantially planar portion being substantially parallel to each other;
a bridging portion having an upper surface and a lower surface, said bridging portion connecting the upper end of the first substantially planar portion and the upper end of the second substantially planar portion, said bridging portion being substantially perpendicular to the plane of said first substantially planar portion and said second substantially planar portion, said first substantially planar portion being spaced from said second substantially planar portion;
a first, substantially circular washer covering a portion of said outer first surface and of said annular first opening and a second, substantially circular washer covering a portion of said outer second surface and of said annular second opening, wherein said first washer and said second washer have different inner diameters;
said first washer and said second washer each comprising at least:
a first planar segment having a first side, a second side, a first thickness, and a first diameter;
a second planar segment disposed on said first side of said first planar segment and having a second thickness and a second diameter; and
a third planar segment disposed on said second side of said first planar segment and having a third thickness and a third diameter,
wherein each of said first diameter, said second diameter, and said third diameter is different; and
wherein said first substantially planar portion and said first washer, and said second substantially planar portion and said second washer, are overmolded together.

2. A fluid transfer assembly comprising:
a fluid connection apparatus including:
a first substantially planar portion having an inner first surface, an outer first surface, an upper end, a lower end and an annular first opening;

a second substantially planar portion having an inner second surface, an outer second surface, an upper end, a lower end and an annular second opening, said inner second surface facing said inner first surface, said first substantially planar portion and said second substantially planar portion being substantially parallel to each other; and, a bridging portion having an upper surface and a lower surface, said bridging portion connecting the upper end of the first substantially planar portion and the upper end of the second substantially planar portion, said bridging portion being substantially perpendicular to the plane of said first substantially planar portion and said second substantially planar portion, said first substantially planar portion being spaced from said second substantially planar portion; and, a first washer covering a portion of said outer first surface and of said annular first opening and a second washer covering a portion of said outer second surface and of said annular second opening, wherein said first substantially planar portion and said first washer, and said second substantially planar portion and said second washer, are overmolded together;

a fluid line fitting positioned between said first substantially planar portion and said second substantially planar portion; and, a connector having a fluid passage formed there, said connector inserted through said first substantially planar portion, said fluid line fitting, and said second substantially planar portion.

3. The fluid transfer assembly of claim 2, further wherein said first washer and said second washer each comprise at least:

a first planar segment having a first side, a second side, a first thickness, and a first diameter;

a second planar segment disposed on said first side of said first planar segment and having a second thickness and a second diameter; and a third planar segment disposed on said second side of said first planar segment and having a third thickness and a third diameter, wherein each of said first diameter, said second diameter, and said third diameter is different from the two other diameters.

4. The fluid transfer assembly of claim 3, wherein said first diameter is larger than said second diameter, and said second diameter is larger than said third diameter.

5. The fluid transfer assembly of claim 2, wherein said bridging portion comprises stabilizing portions extending between an end of said lower surface proximate said inner first surface and said inner first surface, and an end of said lower surface proximate said inner second surface and said inner second surface, said stabilizing portions being operable to resist movement of said first substantially planar portion independently of movement of said second substantially planar portion.

6. A method of connecting a fluid line fitting with an apparatus intended to be in fluid communication with the fluid line fitting, said method comprising:

placing the fluid line fitting between a first substantially planar portion having an inner first surface, an outer first surface, an upper end, a lower end and an annular first opening;

a second substantially planar portion having an inner second surface, an outer second surface, an upper end, a lower end and an annular second opening, said inner second surface facing said inner first surface, said first substantially planar portion and said second substantially planar portion being substantially parallel to each other; and, a bridging portion having an upper surface and a lower surface, said bridging portion connecting the upper end of the first substantially planar portion and the upper end of the second substantially planar portion, said bridging portion being substantially perpendicular to the plane of said first substantially planar portion and said second substantially planar portion, said first substantially planar portion being spaced from said second substantially planar portion; and, at least a first washer covering a portion of said outer first surface and of said annular first opening and a second washer covering a portion of said outer second surface and of said annular second opening, wherein said first substantially planar portion and said first washer, and said second substantially planar portion and said second washer, are overmolded together; and, inserting a connector having a fluid passage formed therein through said first substantially planar portion, said fluid line fitting, and said second substantially planar portion.

* * * * *